Patented Oct. 31, 1933

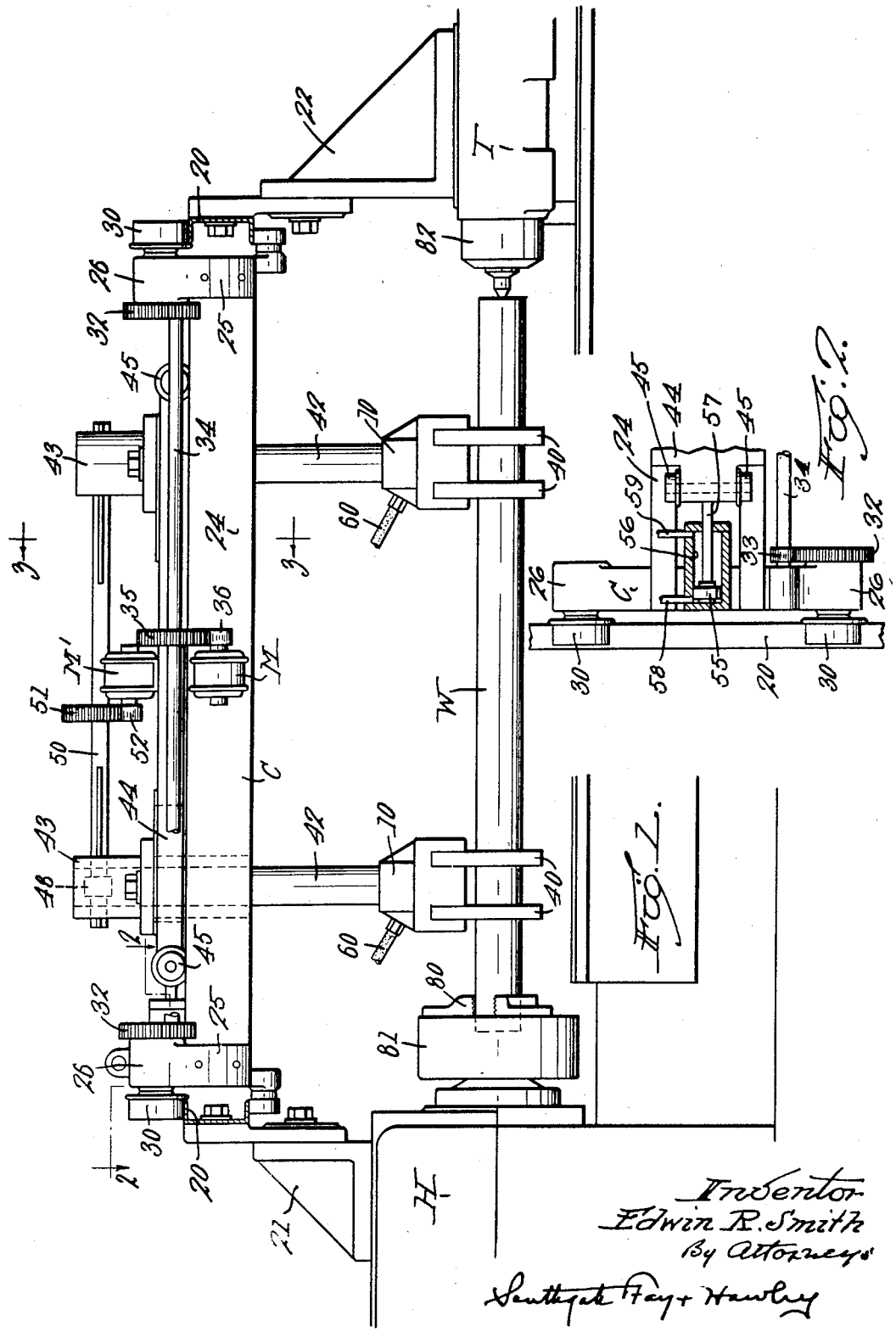

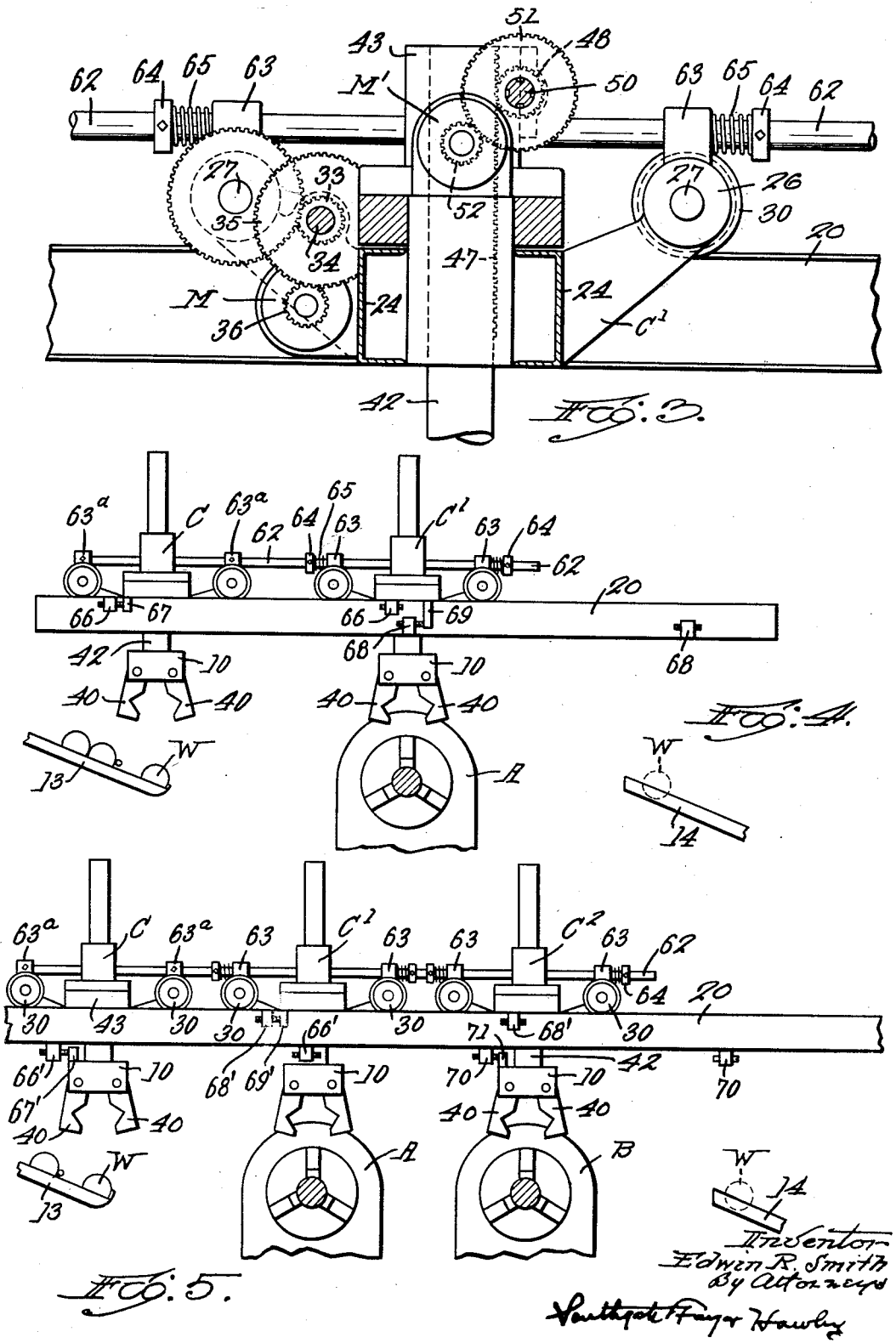

1,933,225

UNITED STATES PATENT OFFICE 1,933,225

WORK HANDLING MECHANISM FOR MACHINE TOOLS

Edwin R. Smith, Seneca Falls, N. Y., assignor to Seneca Falls Machine Company, Seneca Falls, N. Y., a corporation of Massachusetts Application March 3, 1932. Serial No. 596,545

6 Claims. (Cl. 82—2)

This invention relates to mechanism for handling work in connection with machine tool operations. Such mechanism has been heretofore devised for automatically feeding work to machines in which the work is held on centers and for removing the work therefrom. This prior mechanism, however, was not well adapted for use with machines in which the work was inserted axially between the jaws of a driving chuck or in which the work for any reason required movement axially after being presented in alignment with the work-holding devices.

It is the object of my present invention to provide work-handling mechanism by which a piece of work may be raised and lowered and may be moved transversely, as in certain prior commercial mechanisms, and by which the work may be additionally moved axially after being positioned in alignment with the work-holding devices.

I also provide means by which certain movements of a plurality of work-handling devices may be co-ordinated, so that work may be handled for a plurality of machines.

My invention further relates to arrangements and combinations of parts which will be hereinafter described and more particularly pointed out in the appended claims.

A preferred form of the invention is shown in the drawings, in which

Fig. 1 is a side elevation of my improved work-handling mechanism, mounted on the head and tail stocks of a machine tool;

Fig. 2 is a partial sectional plan view, taken along the line 2—2 in Fig. 1;

Fig. 3 is a sectional end elevation, taken along the line 3—3 in Fig. 1;

Fig. 4 is an end elevation showing the invention applied to a single machine tool, and Fig. 5 is a similar view showing the invention applied to two adjacent machine tools.

Briefly described, my invention comprises a plurality of work-engaging or gripper heads 10 (Figs. 4 and 5) which are mounted for upward and downward movements and also for movement transversely to the axis of the machine tool. By such movements, a piece of work W may be removed from a supply or storage runway 13 by a gripper-head 10 and may be transported to working position in a machine tool A, such as a lathe or grinder.

Furthermore, a machined piece of work W in the machine A may be simultaneously removed and transported to a discharge runway 14 in Fig. 4 or to a second machine tool B as shown in Fig. 5. Where two machines are used, a third gripper head 10 removes the work W from the second machine B and delivers the same to a discharge runway 14.

I also provide means to be described for moving the work axially for insertion into or removal from a chuck after the work has been transported to working position.

Referring in detail to the construction of my improved work-handling mechanism, I have provided rails 20 (Fig. 1) mounted on brackets 21 and 22 which are secured to the headstock H and tailstock T of a machine tool, or to other suitable frame structure.

The work-handling devices are assembled on carriages C, C' and C², each comprising side bars 24 secured to end members 25 having upwardly and laterally projecting bearing portions 26 for short horizontal shafts 27 (Fig. 3) on which flanged rollers 30 are secured. These rollers 30 rest upon the rails 20 previously described and the flanges of the rolls engage the inner edges of the rails and are guided thereby.

One shaft 27 at each end of the carriage C is provided with a gear 32 (Fig. 1) engaged by a pinion 33 (Fig. 2) on a cross shaft 34. The shaft 34 is provided with a gear 35 (Fig. 1) near the middle of its length engaged by a pinion 36 on the armature shaft of a reversible motor M, mounted on one of the side bars 24 of the carriage C.

The heads 10 are provided with gripper fingers 40 for engaging the work W and are operated in pairs as shown in Fig. 1 when handling long work. Each gripper-head 10 is mounted at the lower end of a plunger 42, slidable vertically in a bearing member 43 which is clamped to a secondary carriage 44 having flanged rolls 45 at its ends. These rolls 45 engage the upper faces of the side bars 24 of the carriage C.

The bearing members 43 are adjustable lengthwise on the secondary carriage 44 to adapt the mechanism to handle work of different longitudinal dimensions.

Each plunger 42 is provided with rack teeth 47 (Fig. 3) on one face thereof, engaged by a pinion 48 which is keyed to a drive shaft 50. The pinions 48 are slidable axially on the shaft 50 but are non-rotatable relative thereto. The shaft 50 is supported in bearings in the members 43 and is provided with a gear 51 (Fig. 1) engaged by a pinion 52 on the armature shaft of a motor M' by which the gripper heads are raised and lowered.

A piston 55 (Fig. 2) is mounted to slide in a cylinder 56 secured to an end portion of the carriage C, and is connected by a piston rod 57 to one end of the secondary carriage 44. Pipes 58 and 59 are connected to the opposite ends of the cylinder 56. By admitting pressure fluid to one end or the other of the cylinder 56, the secondary carriage 44 and gripper head 10 may be shifted axially of the machine tool on which the mechanism is mounted.

Suitable mechanism is provided for opening and closing the gripper fingers 40, such mechanism being preferably pressure-operated through supply pipes 60 (Fig. 1).

A pull rod 62 (Figs. 4 and 5) extends loosely through bearings 63 on the carriages C' and C² and is fixed in similar bearings 63ª on the carriage C. The rod 62 is provided with collars 64 and cushioning springs 65.

Stops 66 (Fig. 4) are provided on the rail 20 for engagement by a lug 67 on the carriage C and stops 68 (Fig. 4) are provided for engagement by a lug 69 on the carriage C'. Similar stops 66' and 68' (Fig. 5) and additional stops 70 are provided in the three carriage construction shown in Fig. 5. These stops cooperate with lugs 68' and 70 on the heads 10 of the carriages C and C² (Fig. 5) and with a lug 69' on the carriage C'.

With this construction, one motor M is ordinarily provided on the carriage C, and the other carriages C' and C² are actuated through the pull rod 62 from the carriage C. The limiting positions of the carriages are determined by the stops 66, 68 and 70. The springs 65 permit a slight yielding movement of the pull rod after the carriage C' or C² engages one of its stops 68 or 70.

For handling very heavy work, a single motor M may be insufficient, in which case each carriage may be provided with its own motor and the carriages may be operated independently. Even where separate motors are used, however, it is more desirable to coordinate the movements of the carriages by the use of the pull rod 62.

Having described the details of construction of my improved work-handling mechanism, the method of operation is as follows:

Assuming the gripper heads to be in the initial position shown in Figs. 4 or 5, the motors M' will be operated to lower the gripper heads 10, after which pressure fluid will be admitted through the pipes 60 to close the gripper fingers 40 on pieces of work W on the supply runway 13 or in the machines A or B.

Pressure is then admitted through the pipes 58 to the cylinders 56, thereby moving the secondary carriages 44 and the gripper heads 10 axially to the right in Fig. 1 to remove the work from between the jaws 80 of a chuck 81. It is assumed that the tail center 82 has been withdrawn after the grippers 40 are closed, so as to permit such longitudinal movement.

The motors M' are then reversed to raise the gripper heads 10, and the motors M are then rendered operative to move the carriages C, C' and C² transversely of the machines A and B until the carriage C is positioned over the machine A and the carriage C' is aligned with the machine B, with the carriage C² stationed above the discharge runway 14.

The motor M' is then operated to lower the gripper heads 10 to bring the work pieces W into alignment with the chucks 81. Pressure is then applied in the cylinders 56 through the pipes 59, pulling the secondary carriages 44 to the left in Fig. 1 and thus inserting the ends of the work pieces W between the jaws 80 of the chucks 81.

The jaws 80 are then tightened and the tail centers 82 are advanced against the work, after which the pressure in the pipes 60 is relieved, permitting the grippers 40 to open and release the work. The motors M' are operated in reverse direction to raise the gripper-heads 10, and the motor M is operated in reverse direction to return the carriages to initial position.

These various operations may be controlled manually or suitable automatic control mechanism may be provided. A general disclosure of of suitable control mechanism is shown in the copending application of Smith and Schinkez, Serial No. 595,546 filed March 3, 1932.

Having described the construction and operation of my improved work-handling mechanism, it will be evident that I have provided mechanism particularly adapted to the handling of long pieces of work and to the inserting of such work between the jaws of a driving chuck, where this method of driving is used. The mechanism is also of marked utility where the work is mounted upon centers, but in the latter case the use of the cylinder 56 may usually be omitted. It is also obvious that shorter pieces of work may be handled by a single gripper-head, and that the second head of the pair may be rendered inoperative by removing its pinion 48 or by entirely removing the head from the carriage 44.

The invention is also applicable to machines in which the work is mounted on axially slidable centers and in fact to any machine in which the work, whether rotated or not, requires an axial movement after being positioned in alignment with work-holding devices.

Having thus described my invention and the advantages thereof, I do not wish to be limited to the details herein disclosed, otherwise than as set forth in the claims, but what I claim is:—

1. Work-handling mechanism for a machine tool comprising work-engaging devices spaced longitudinally of the work, motor-driven means to move said devices simultaneously transversely of the machine tool, fluid-pressure-operated means to move said devices simultaneously longitudinally of the machine tool, and motor-driven means to arise and lower said devices simultaneously.

2. Work-handling mechanism for a machine tool comprising work-engaging devices selectively spaced longitudinally of the work, means to move said devices transversely of the machine tool, means to raise and lower said devices, and means to move said devices to shift the work longitudinally when the work is in lowered and operative position.

3. Work-handling mechanism for a machine tool comprising a frame fixed on said machine tool, a main carriage movable on said frame transversely of the machine tool, a secondary carriage movable on said main carriage longitudinally of the machine tool, work-engaging devices mounted on said secondary carriage, and actuating means to move said carriages and to raise and lower said work-engaging devices.

4. Work-handling mechanism for a machine tool comprising a frame fixed on said machine tool, a main carriage movable on said frame transversely of the machine tool, a secondary carriage movable on said main carriage longitudinally of the machine tool, work-engaging devices mounted on said secondary carriage and substantially spaced apart to engage the work at longitudinally separated points, and actuating means to move said carriages and to raise and lower said work-engaging devices.

5. Work-engaging mechanism for a machine tool as set forth in claim 4, in which the work-engaging devices are mounted in bearing members adjustable on said secondary carriage longitudinally of the work.

6. Work-engaging mechanism for a machine tool as set forth in claim 4, in which the work-engaging devices are mounted in bearing members adjustable on said secondary carriage longitudinally of the work, and in which the actuating means for raising and lowering the work-engaging devices is mounted on said secondary carriage and is operably connected to said devices in all relative positions thereof.

EDWIN R. SMITH.